United States Patent [19]
Bunting

[11] 3,912,913
[45] Oct. 14, 1975

[54] PROCESS CONTROL METHOD AND APPARATUS

[75] Inventor: James William Bunting, Leamington Spa, England

[73] Assignee: Courtaulds Engineering Limited, Coventry, England

[22] Filed: Apr. 8, 1974

[21] Appl. No.: 458,464

[30] Foreign Application Priority Data
Apr. 9, 1973 United Kingdom............... 16865/73

[52] U.S. Cl. ................. 235/150.1; 236/46; 318/601
[51] Int. Cl.².................... G05B 11/01; G05B 19/02
[58] Field of Search..................... 235/151.1, 151.12; 236/46 F, 15 B, 78 D; 318/601

[56] References Cited
UNITED STATES PATENTS

| | | | |
|---|---|---|---|
| 3,240,922 | 3/1966 | Scholten............................. | 235/176 |
| 3,321,608 | 5/1967 | Sterling............................. | 235/151.1 |
| 3,392,914 | 7/1968 | Nienstaedt................... | 235/151.1 X |
| 3,643,076 | 2/1972 | Bell et al.......................... | 235/151.1 |

*Primary Examiner*—Eugene G. Botz
*Attorney, Agent, or Firm*—Davis, Hoxie, Faithfull & Hapgood

[57] ABSTRACT

A method for controlling changes in the value of a process variable includes the steps of producing electrically a digital number signal representing the desired value of the variable, periodically adding to or subtracting from that number a digital number representing a required change in the variable, to produce an updated desired value signal, and comparing the latter signal or an analogue of it electrically with a signal representing the measured value of the variable to obtain a control signal for regulating the value of the variable. The method is applicable to the control of many industrial processes, for example the control of temperature in a dyebath, temperature cycles in baking ovens, pottery firing ovens and metal treatment furnaces, rates of flow of gases and liquids, tool movements in contour machine tools, and "loss of weight" feeding systems. Apparatus for carrying out the process is also described, comprising a first shift register for storing a binary number representing a desired value of the variable, a second shift register for storing a binary number representing a change to be made to the desired value in a predetermined time, programme means for receiving programme instructions and periodically transferring numbers to the second shift register, means for periodically combining the numbers in the two registers to produce an updated number and means for transferring periodically updated number signals to a comparator stage for comparison with electric signals representing the measured value of the variable to produce control signals for influencing the variable.

11 Claims, 4 Drawing Figures

PROCESS CONTROL METHOD AND APPARATUS

This invention relates to a method and apparatus for effecting control of changes in a process variable, and more particularly for effecting such changes at pre-chosen rates.

One example of a process variable which the invention may be used to control is temperature. In many manufacturing operations which involve heating or cooling treatments, it is desirable not only to apply a controlled temperature, but also to ensure that the heating to and/or the cooling from such a temperature is carried out at a pre-chosen rate. Moreover it may be necessary to vary the rate of heating and/or cooling in a pre-chosen manner in order to achieve some desired property in an end product. Examples of processes in which such temperature control is desirable include annealing treatments and textile dyeing operations.

In the latter, proper control of the dyeing operation normally requires that the dyebath liquor be brought to a precise temperature at a closely controlled rate, that it be held at the dyeing temperature for a predetermined period of time, and that it be subsequently cooled at the same, or another closely controlled rate. This is necessary to ensure uniformity of shade between successive batches of fabric treated in successive dyeing operations.

Various forms of apparatus for controlling processes are known which include electric circuitry for producing signals representing measured and desired values for a processes variable to be controlled, for comparing these values and for effecting the required change in the variable. Such apparatus usually employs either digital or analogue signals. The use of digital signals has been criticised where rates of change are required to be controlled because a signal representative of the rate of change or "slope", is generated as a number of steps rather than a smooth line, as is the case when analogue signals are used. However, for many purposes digital signals can provide an adequate degree of precision of control.

This invention concerns particularly electric circuitry for producing digital signals for controlling the slope or rate of change of a process variable, and apparatus embodying the circuitry and utilising either digital or analogue signals for effecting control as may be desired.

According to the invention a method for controlling changes in the value of a process variable includes the steps of producing electrically a digital number signal representing the desired value of the variable, periodically adding to or subtracting from that number a digital number representing a required change in the variable, to produce an updated desired value signal, and comparing the latter signal or an analogue of it electrically with a signal representing the measured value of the variable to obtain a control signal for regulating the value of the variable.

The digital number signals may be binary numbers or binary coded decimal numbers represented electrically according to well known practices.

Preferably the method also includes the step of periodically comparing signals representing the desired value of the variable and a final value it is to achieve to produce a further signal to determine automatically whether the said signal representing the required change is to be added to or subtracted from the desired value signal.

Further, according to the invention, apparatus for controlling a process variable comprises a first shift register for storing a binary number representing a desired value of the variable, a second shift register for storing a binary number representing a change to be made to the desired value in a predetermined time, programme means for receiving programme instructions and periodically transferring numbers to the second shift register, means for periodically combining the numbers in the two registers to produce an updated number and means for transferring periodically updated number signals to a comparator stage for comparison with electric signals representing the measured value of the variable to produce control signals for influencing the variable.

Preferably means are provided for "inverting" (that is producing the complement or negative value of) the number stored in the second register where the change to be made to the desired value is a reduction, and the apparatus may include means for comparing the desired value of the variable with a final value to be achieved, whereby to determine automatically whether an increase or reduction of the value of the variable is required.

An embodiment of the invention, applied to the control of temperature in a dyeing process, is illustrated by way of example by the accompanying diagrammatic drawings, in which.

All the circuits utilise, wherever possible, integrated circuit type digital logic elements which are readily available at low cost. Since these elements are well-known their internal circuitry will not be described.

Figure 1:
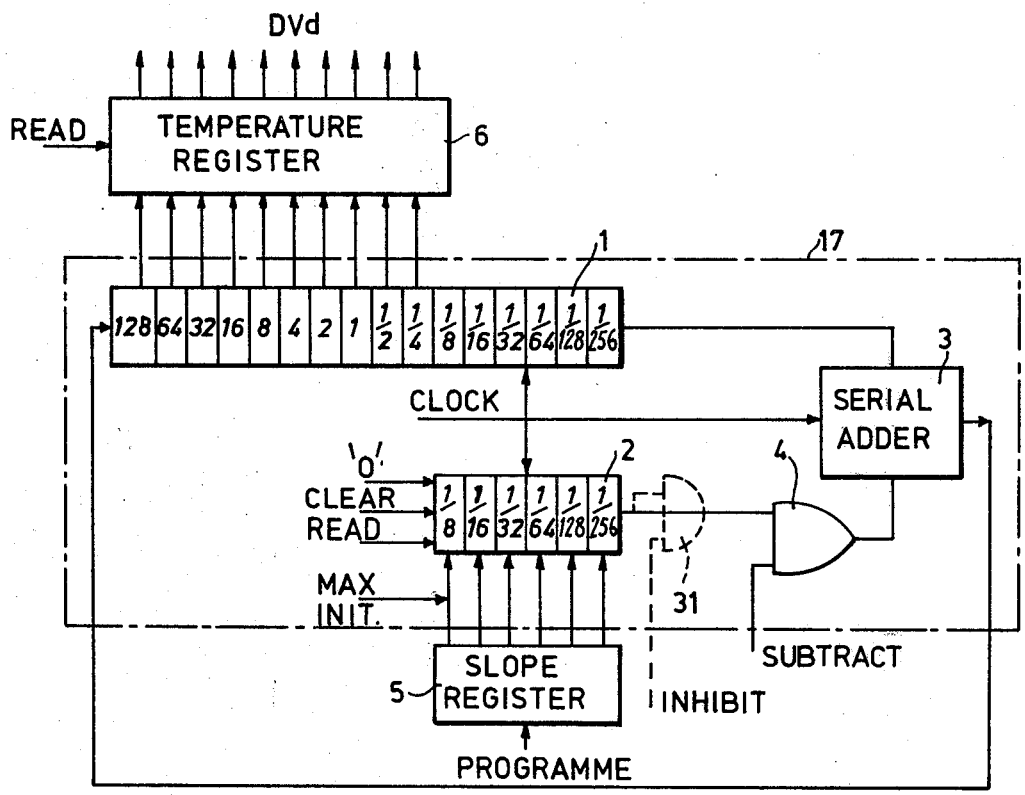
FIG. 1 shows a circuit for providing digital slope signals.

Referring first to FIG. 1, the circuit shown includes an arithmetic unit 17 comprising two integrated circuit shift registers 1 and 2, connected to the inputs of a serial adder 3, the output of which is connected back to the opposite end of the shift register 1, wherein binary numbers stored in the two shift registers can be added and the sum can be fed back to the shift register 1. An inversion element 4 is connected in the line from the shift register 2 to the serial adder 3 whereby the number contained in that register can be inverted to be fed to the serial adder, giving the effect of subtraction. This inversion element 4 is an "Exclusive Or" gate, one input and the output of which constitute the line from the second shift register 2 to the serial adder. An "0" signal is applied to the second input (marked SUBTRACT) when the number in the second shift register is to be added to that in the first shift register, when an increase in temperature is required, and the signals at the first input are then reproduced at the output. When a decrease of temperature is required the number in the second shift register 2 has to be subtracted from that in the first shift register, and a "1" signal is then applied to the second input. The signal at the output of the element 4 is then the complement of that applied to the first input, and adding this to the number in the first shift register 1 in the serial adder 3, has the same result as subtracting the number in the second shift register 2.

The serial adder 3 and the two shift registers 1 and 2 are activated periodically by the supply of a series of clock pulses, the effect of each clock pulse being to move every bit of information in the two shift registers, except that in the furthermost right-hand stage of each shift register, one stage to the right. The bits in these furthermost right-hand stages are added in the serial adder (after inversion of the bit in the second shift register if subtraction is required) and fed back to the furthermost left-hand stage of the first shift register 1. Thus after 16 clock pulses have been supplied to the serial adder the numbers in the two shift registers have been added and their total is stored in the 16 stages of the first shift register in appropriate order of significance from left to right. The second shift register 2 then contains the number zero.

The 10 most significant stages of the first shift register are connected to a 10-stage integrated circuit register 6, which serves as a temperature register, and on applying a "Read" pulse to this register it will accept the ten most significant bits of the number in the shift register 1. This is the significant part of the sum of the two numbers originally stored in the two shift registers, and represents the new, updated, desired value DVd of the temperature. Simultaneously a Read pulse can also be supplied to the second shift register 2 to enable it to accept again the number representing slope from a slope register 5.

By repeating this sequence of operations the number contained in the temperature register is periodically updated, and represents the instantaneous desired value of the temperature being controlled.

The number of stages in the various registers depends upon the range of temperatures and slopes it is desired to accommodate. It has been found desirable to provide 16 stages in the first register 1 since this must be able to accept binary numbers representing temperatures up to the boiling point of water at elevated pressures and increments down to 1/256°.

In practice in dyeing machinery steps of ¼° are small enough to be insignificant in terms of deviation from a smooth rate of change, and it is necessary only to provide ten stages in the temperature register 6, covering, for example, the range 0 – 255¾°C in increments of ¼°C. The range of slopes required is typically ¼°C per minute to 15¾°C per minute, obtained as a binary combination of steps of ¼, ½, 1, 2, 4, 8°C per minute. To maintain the effect of smooth changes, the number in the second shift register 2, which is to be added to that in the first shift register 1, must never exceed ¼°C. To obtain a rate of change of 15¾°C per minute with a maximum step of ¼°C it will be understood that 63 steps are required, and the arithmetic unit is therefore arranged to operate 64 times per minute. To provide the minimum slope of ¼°C per minute with this rate of addition, the minimum step must be ¼ × 1/64 = 1/256°C. Thus the resolution of the second shift register 2 is in six stages, representing respectively 1/256, 1/128, 1/64, 1/32, 1/16 and 1/8°C per minute. Thus by causing the number in the first shift register 1 to be updated 64 times per minute, with maximum steps of ¼°, for practical purposes the actual changes of the temperature being controlled follow a smooth line, even though control is by digital signals.

Figure 2:
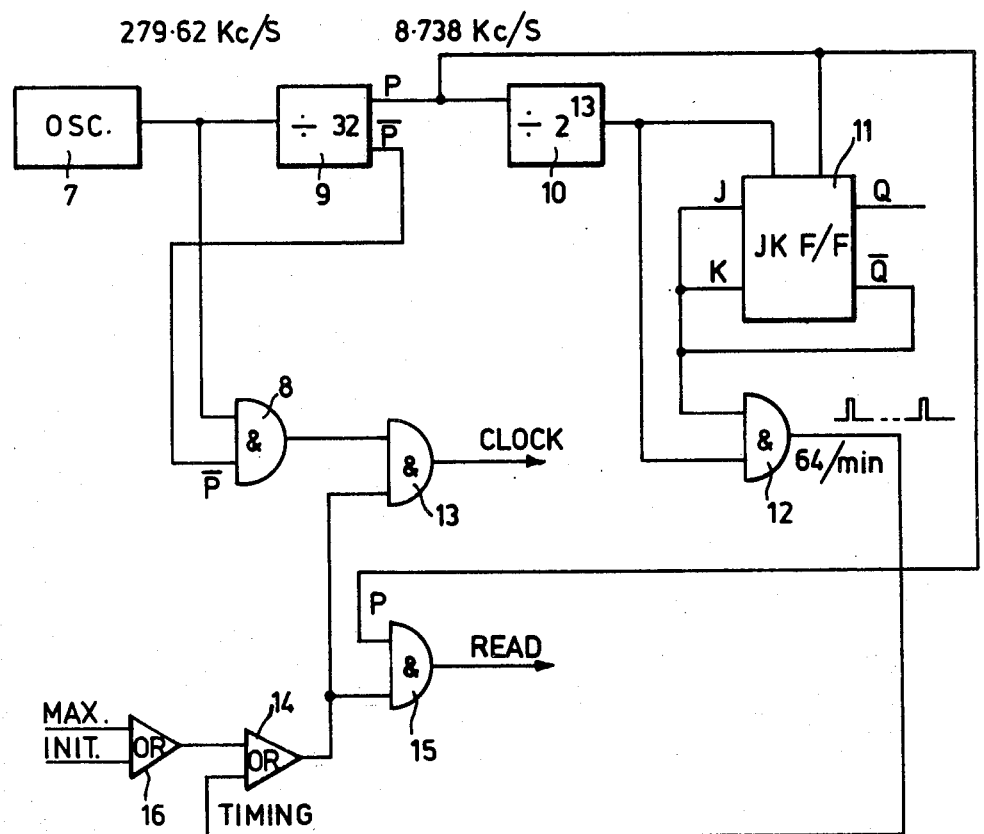
FIG. 2 shows the circuit for producing pulses to drive the circuit shown in FIG. 1.

The circuit for operating the arithmetic unit 17 is shown in FIG. 2. An oscillator 7 produces a continuous signal comprising a series of 'clock' pulses with a frequency of 279.62 Kc/S. This signal is fed to one input of an 'And' gate 8 and to a dividing element 9 which has a divisor of 32 and has twin outputs at which opposite square wave signals P and $\bar{P}$ are produced with a frequency of 8.738 Kc/s. The P signal is fed forward to a further dividing element 10 having a divisor of $2^{13}$ which produces an output signal of 64 cycles per minute. This latter signal is fed to the 'Clear' terminal of a JK flip-flop element 11 and to one input of an And gate 12. The $\bar{Q}$ output of the JK flip-flop element 11 is connected back to its J and K inputs and to the second input of the And gate 12. The P signal is also fed to the "clock" terminal of the JK flip-flop element 11. A zero signal on the Clear terminal of the JK flip-flop element 11 holds it in the "off" condition, in which the Q output is at zero and the $\bar{Q}$ output is 1. When a positive signal is applied to the Clear terminal the condition of the element 11 can be reversed by the trailing end of a pulse applied to the clock terminal. The effect of this arrangement is that when the output signal of the dividing element 10 changes from zero to positive the output of the And gate 12 also goes positive, but the latter output is cut off by the trailing end of the next pulse of the P signal. Thus the output of the And gate 12 is a short pulse of the duration of one cycle of the P signal occurring at the commencement of each positive pulse of the output signal of the dividing element 10, that is, 64 times per minute. These pulses serve as timing pulses.

As mentioned, the original oscillator signal with a frequency of 279.62 Kc/s is fed to one input of the And gate 8. The $\bar{P}$ signal is fed to its other input. Since the original oscillator signal has a frequency which is thirty-two times the frequency of the $\bar{P}$ signal, and the And gate 8 will conduct only when both its inputs are positive, the And gate 8 transmits 16 of the original clock pulses while the $\bar{P}$ signal is positive, then produces no output for the next 16 clock pulses, while $\bar{P}$ is zero. The output from the And gate 8 is thus a series of spaced apart groups of sixteen clock pulses which are fed to one input of a further And gate 13. The timing signal formed by the pulses obtained from the output of the And gate 12 is fed via an 'Or' gate 14 to the other input of this gate 13 which thus transmits one of the groups of 16 clock pulses for every timing pulse — that is 64 times per minute. This group of clock pulses is fed from the output of the And gate 13 to the shift registers 1 and 2 and the serial adder 3 of the arithmetic unit 17, and so updates the number in the first shift register 1 64 times per minute.

The timing signal is also fed from the Or gate 14 to one input of yet another And gate 15, the other input of which is supplied with the P signal. This And gate 15 thus transmits a single timing pulse at the commencement of each pulse of the P signal, that is immediately after the And gate 13 has transmitted a group of 16 clock pulses. These single pulses transmitted by the And gate 15 are fed to the temperature register 6 to cause it to read the number from the first shift register 1 and to the second shift register 2 to cause it to read the number from the slope register 5. They will be referred to for convenience as read pulses.

Thus it will be seen that the arithmetic unit 17 is caused to execute one complete operation 64 times per minute.

To provide for rapid updating of the number in the temperature register 6, either to increase the temperature at the maximum rate of which the dyeing apparatus is capable — a process which will be referred to as "maximising" — or to bring the number up to the equivalent of the actual measured temperature at the start of a heating or cooling cycle — which will be referred to as "initialising" — arrangements are provided for causing the And gates 13 and 15 to transmit pulses much more frequently by supplying alternative signals to their inputs through the Or gate 14. As mentioned above, when a positive signal is supplied to these And gates, when a positive signal is supplied to these And gates, the gate 13 will transmit a group of 16 clock pulses and immediately afterwards the And gate 15 will transmit one read pulse. Normally only one group of clock pulses followed by one read pulse is transmitted by these gates on receipt of each timing pulse. However, if the And gates 13 and 15 are supplied with a constant positive signal at one of their two inputs they will transmit, respectively, clock pulses and read pulses on the occurrence of pulses at the other of their inputs. In this case, therefore, the arithmetic unit 17 will be activated with the frequency of the P and P̄ signals, 8.738 Kc/s, instead of only at the much lower frequency of 64 timing pulses per minute.

The maximising and initialising signals are provided from a programme reader which includes appropriate switches activated by information in the programme, and they are supplied to an Or gate 16 so that either signal can be fed to the Or gate 14 and will be transmitted through that gate as an alternative to the timing pulses from the And gate 12.

Figure 3:
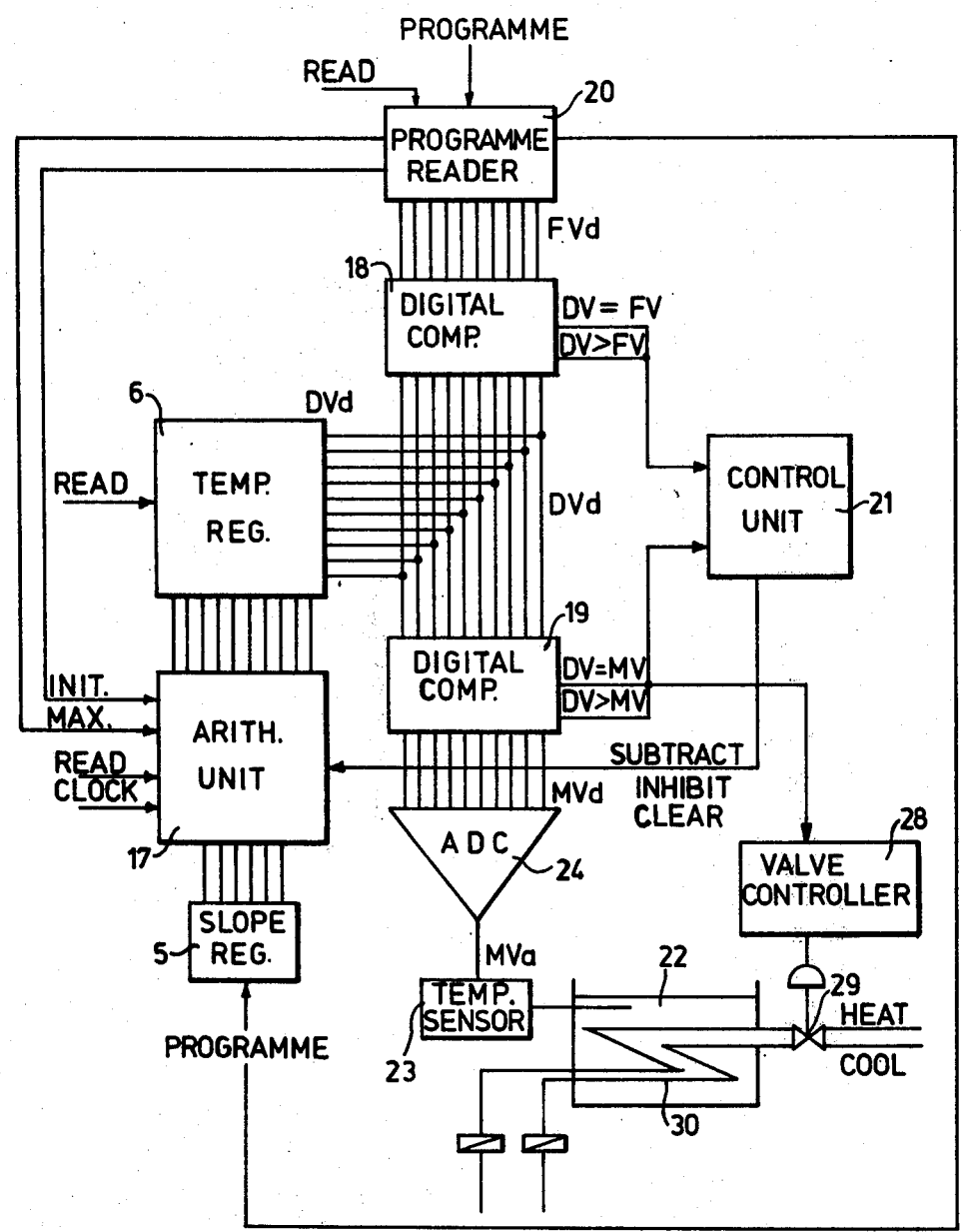
FIG. 3 shows the application of the circuit of FIG. 1 to a dyebath temperature controller employing digital signals for effecting control.

FIG. 3 shows diagrammatically a complete temperature control apparatus embodying the arithmetic unit 17 shown in FIG. 1 and employing digital control signals. As described with reference to FIG. 1, the 10 most significant bits of the number held in the first shift register of the arithmetic unit 17 are fed periodically to the temperature register 6 which thus holds a 10-bit number DVd, which is periodically updated, representing the desired value of the temperature which is to be attained before the next updating if the intended temperature slope, as indicated in the slope register 5 by the programme, is to be achieved. This number is fed to one set of inputs of each of two digital comparators 18, 19 respectively for comparing the desired value digitally with the final value of the temperature to be achieved and with the measured value.

The final value is contained in the programme which, as mentioned, may be coded for example on a punched card or tape which is read by an appropriate reader 20 and rendered as a 10-bit number FVd to the other set of inputs of the digital comparator 18. The digital comparator 18 compares the two numbers and produces signals at one or other of its two outputs when the desired value is greater than, or is equal to, respectively, the final value. These signals are fed to a control unit 21. (Because of the logic used it is not necessary to provide a signal indicating that the desired value is less than the final value, since this is indicated by the absence of a signal on either of the two outputs mentioned).

The actual temperature in the dyebath 22 under control is measured by a sensor 23 which produces an analogue signal MVa representing the measured temperature, which is fed to the input of an analogue-to-digital converter 24. This renders the measured value as a 10-bit number MVd which is fed to the second set of inputs of the digital comparator 19 which compares it with the number DVd and produces signals at one or other of its two outputs when the desired value is equal to, or greater than, respectively, the measured value. These signals are also fed to the control unit 21.

Figure 4:
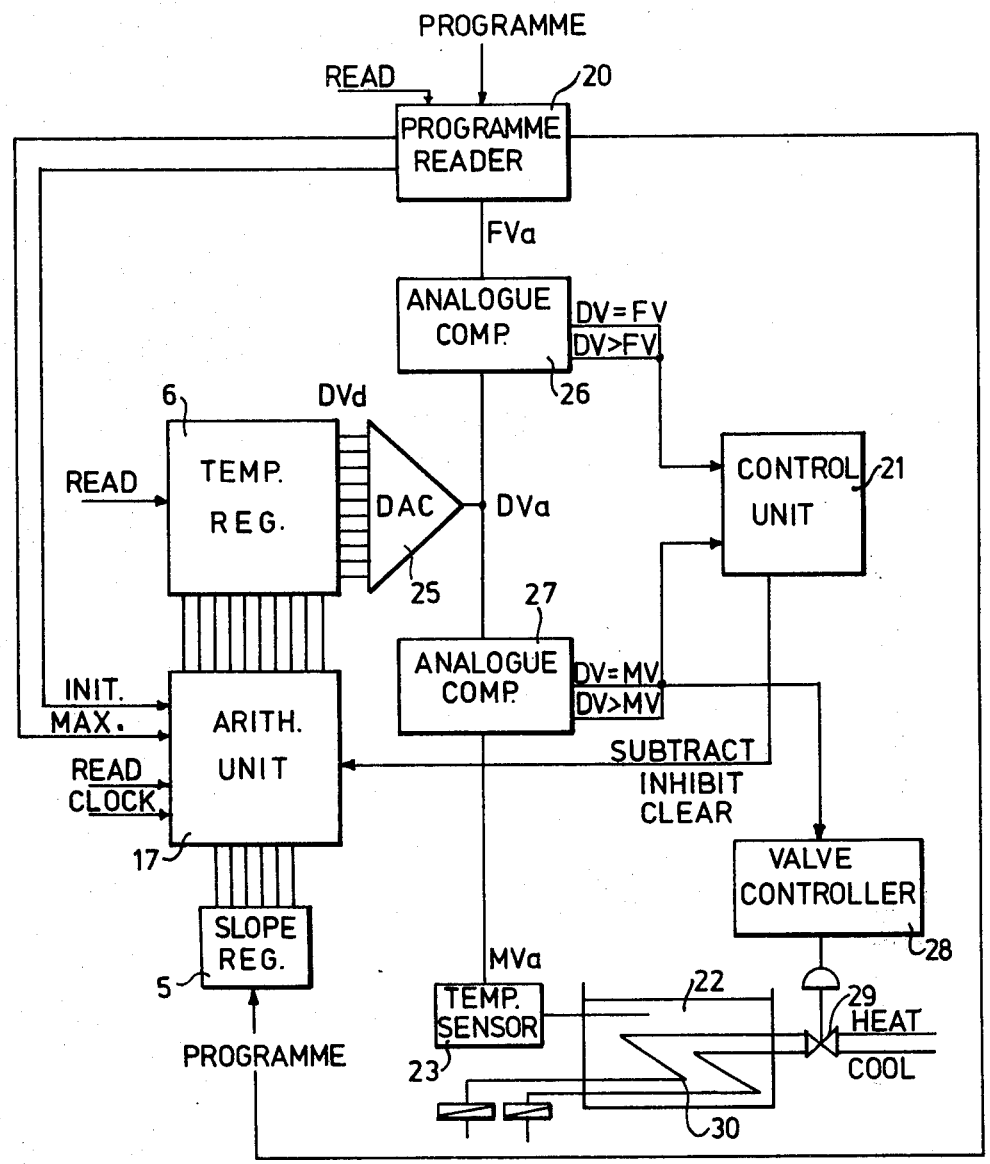
FIG. 4 shows the application of the circuit of FIG. 1 to a dyebath temperature controller employing analogue signals for effecting control.

FIG. 4 is a similar diagrammatic representation of a temperature control apparatus embodying the arithmetic unit 17 shown in FIG. 1 and employing analogue control signals. Components which are similar to those described with reference to FIG. 3 carry similar reference numerals and are similarly located in the drawing, and their function will not be described again.

In this apparatus the number DVd held in the temperature register 6 is fed to a digital-to-analogue converter 25 which produces an output signal DVa representing the desired value of the temperature in analogue form. This signal is fed to two analogue comparators 26, 27 for comparing the signal respectively with analogue signals FVa and MVa representing, respectively, the analogues of the final value and the measured value of the temperature. The final value signal FVa is produced from the programme by the reader 20 which in this case is of the type producing an analogue output. The analogue comparator compares the signals FVa and DVa and produces signals at its outputs when the desired value is equal to, or greater than, the final value. These signals, as before, are fed to the control unit 21.

The measured value of the temperature is rendered in analogue form MVa by the sensor 23 as in the previous case, and this signal is fed to the analogue comparator 27 where it is compared with the desired value DVa and signals are produced at its outputs and fed to the control unit 21 when the desired value is equal to, or greater than, the measured value.

In both the apparatus of FIG. 3 and FIG. 4 logic is included to determine automatically whether the slope is to be positive or negative and whether heating or cooling is required. The programme then has only to indicate the required slope and the final value to be achieved. The slope information is given by the presence or absence of an output signal from the comparator 18 or 26, presence of an output signal indicating that the desired value is greater than or equal to the final value. If either of these output signals is present, indicating that a negative slope is required, it causes the control unit to feed a 1 signal to the second input of the Exclusive Or gate inversion element 4 of the arithmetic unit 17, causing it to invert the numbers fed to it from the second shift register 2, as described. If no output signal is present on either output of the comparator 18 or 26, no signal is fed to the second input of the inversion element 4, and normal addition takes place in the arithmetic unit 17, giving a positive slope.

The information as to whether heating or cooling is required is given similarly by the presence or absence of an output signal from the other comparator 19 or 27, the presence of an output signal indicating that the desired value is either greater than or equal to, the measured value, depending on which of the two outputs from the comparator carries the signal. The absence of any output signal indicates that the measured value exceeds the desired value so that cooling is required. If the comparator 19 or 27 is giving an output equal on that output which indicates that the desired value is equal to the measured value, neither heating nor cooling is required. If an output signal appears on the output indicating that the desired value is greater than the measured value, heating is required. The signals from the comparator 19 or 27 are fed to an electromechanical valve controller 28 which appropriately operates valves 29 to admit steam or cold water to heating and cooling coils 30 in the dyebath 22.

With the apparatus of either FIG. 3 or FIG. 4, when a temperature change cycle is to be undertaken, as when a dyeing operation is to be commenced, the appropriate programme will be supplied to the programme reader 20 and the dyebath will be filled. The programme will commence with an initialising signal which will cause a 1 to be loaded into the most significant stage of the second shift register 2, and cause the arithmetic unit 17 to be activated at the frequency of the P and P̄ signals, as mentioned, until the temperature represented by the number held in the first shift register 1 and read into the temperature register 6 reaches the measured value, as determined by the comparator 19 or 27. The appropriate signal will then be transmitted by this comparator to the control unit 21, which will feed a 'clear' signal to the second shift register 2 of the arithmetic unit 17. This holds the number in that register at zero for as long as the initialising signal remains on. If it is desired to raise the temperature as quickly as possible a maximising signal is supplied to the And gates 13 and 15 through the Or gates 16 and 14, and again a 1 signal will be fed to the most significant stage of the second shift register, and the number held in the temperature register will be updated rapidly and repeatedly until it reaches the final value being read from the programme, as determined by the comparator 18 or 26, which will then give the appropriate signal to the control unit 21, and again a clear signal will be supplied by the control unit 21 to the arithmetic unit 17. At this time the comparator 19 or 27 will indicate to the valve controller 28 that the desired value DV is greater than the measured value, causing it to operate the valves 29 to admit steam to the heating coil 30, and heating will continue whilst the programme is held until the measured value reaches the disired value, when the clear signal will be cut off and the cycle can continue.

If instead of a maximum temperature rise a controlled temperature slope is required the programme reader 20 will feed the appropriate slope numbers to the slope register 5 and the number DVd in the temperature register 6 will be updated accordingly. Again, when the desired value reaches the final value a clear signal will be supplied to the arithmetic unit 17, holding the number DVd in the temperature register 6 constant until further information is read from the programme. Heating will continue until the measured value reaches the desired value.

The apparatus operates in the same way for cooling, but in this case the comparator 19 or 27 will give no signal to the valve controller 28, indicating that the desired value DV is less than the measured value MV, and the controller 28 will operate the valves 29 to admit cooling water. At the same time the comparator 18 or 26 will be indicating to the control unit 21 that the desired value is greater than the final value, and a 1 signal will be fed by the control unit 21 to the Exclusive Or gate 4 of the arithmetic unit 17 to cause the slope numbers to be subtracted from the numbers in the first register 1. The comparator 19 or 27 will monitor the values of the desired value and the measured value and indicate to the control unit when they are equal.

Instead of supplying a clear signal from the control unit 21 to stop further heating or cooling as described above, a signal could be applied to inhibit the read pulses so that no further numbers are read into the arithmetic unit and the temperature unit. Another possibility is to inhibit the feeding of slope numbers from the second shift register 2 to the serial adder 3. For this purpose an And gate 31 may be included in the link from the shift register 2 to the serial adder 3, as shown in dotted detail in FIG. 1. The output of the shift register 2 is supplied to one input, and a positive or 1 signal is normally applied to the other input, so that signals from the shift register 2 will normally pass to the serial adder 3. When it is desired to stop further heating or cooling a 0 signal can be applied from the control unit to the other input of the And gate 3, so inhibiting the passage of further signals from the shift register 2 to the serial adder 3.

It will be understood that the circuits shown in FIGS. 3 and 4 are not the only arrangements utilising the periodically updated number held in the temperature register. For example, digital comparison could be used for monitoring the desired value against the final value, as described with reference to FIG. 3, with analogue comparison between desired value and measured value as described with reference to FIG. 4, and vice versa.

The valve controller 28 described with reference to FIGS. 3 and 4 is of the simple type which simply opens or closes the valves 29. However, proportional or integral controllers could be used with circuits embodying the invention, in which case it would be necessary to supply to the controller, signals representing the desired value and the measured value in addition to the signals from the comparator 19 or 27.

Although the invention has been described in a particular application to the control of temperature in a dyebath, and in this form can be used as a part of an automatic dyeing cycle controller, it will be understood that it is applicable to the control of many industrial processes where accurate control of a temperature cycle is required, such as the control of bakery ovens, pottery firing ovens or metal treatment furnaces. It is also applicable to the control of any other industrial process variable the desired value of which can be represented digitally, and the actual value of which can be measured by a device producing either an analogue or a digital signal. Examples are rates of flow of gases or liquids, tool movements in contour machine tools and loss of weight feeding systems. The invention provides cheap and readily adaptable circuitry, and the use of integrated circuit type elements very largely removes the need for making special provisions to protect the equipment from adverse conditions, such as high temperatures or humidity which are often encountered in industrial applications, and can cause difficulty with other types of equipment.

What is claimed is:

1. A method for controlling changes in the value of a process variable including the steps of producing electrically a digital number signal representing the desired value of the variable, adding to that number at successive equal intervals of time the positive or negative digital number representing the magnitude of a required change in the variable, to produce an updated desired value signal, and comparing the latter signal or an analogue of it electrically with a signal representing the measured value of the variable to obtain a control signal for regulating the value of the variable.

2. A method according to claim 1 wherein the digital number signals are binary numbers.

3. A method according to claim 1 wherein the digital number signals are binary coded decimal numbers.

4. A method according to claim 1 including the step of periodically comparing the signal representing the desired value of the variable with a signal representing the final value it is to achieve and thereby producing a further signal determining automatically whether the said number representing the required change is to be added to or subtracted from the desired signal value.

5. Apparatus for controlling a process variable comprising a first shift register for transient storage of a binary number representing a desired value of the variable, a second shift register for momentarily storing a binary number representing a change to be made to the desired value in a predetermined time, programme means for receiving programme instructions and periodically transferring numbers to the second shift register, means for periodically combining the numbers in the two registers to produce an updated number and means for transferring periodically updated number signals to a comparator stage for comparison with electric signals representing the measured value of the variable to produce control signals for influencing the variable.

6. Apparatus according to claim 5 wherein the means for combining the numbers in the two registers comprises a serial adder for adding the number stored in the second shift register to that stored in the first shift register.

7. Apparatus according to claim 6 wherein the programme means includes means responsive to a programme instruction indicating the final value to be achieved by the variable to produce an electric signal representing the final value and the comparator stage includes means for comparing periodically the desired value with the final value for producing a 'subtract' signal when the desired value exceeds the final value, including inversion means responsive to the said 'subtract' signal for feeding the complement of the number stored in the second shift register to the serial adder instead of that number itself.

8. Apparatus according to claim 7 wherein the electric signal representing the final value is a digital signal and the means for comparing it with the desired value signal is a digital device.

9. Apparatus according to claim 7 wherein the electric signal representing the final value is an analogue signal, including a digital-to-analogue converter for receiving the said updated numbers and producing analogue signals representing the said numbers, the means for comparing the desired value with the final value being an analogue device.

10. Apparatus according to claim 5 including an analogue sensor for measuring the actual value of the variable and producing a voltage signal representing this measured value, and an analogue-to-digital converter for producing a digital signal representing the measured value, the comparator stage including a digital device.

11. Apparatus according to claim 5 including an analogue sensor for measuring the actual value of the variable and producing a voltage signal representing this measured value, a digital-to-analogue converter for receiving the said updated numbers and producing analogue signals representing the said numbers, the comparator stage including an analogue device.

* * * * *